Jan. 8, 1924.  1,480,076
G. JACQUET
CHECKING APPARATUS FOR PIGEON FLYING COMPETITIONS
Filed Feb. 5, 1923   2 Sheets-Sheet 1

Inventor:
G. Jacquet

Jan. 8, 1924. 1,480,076
G. JACQUET
CHECKING APPARATUS FOR PIGEON FLYING COMPETITIONS
Filed Feb. 5, 1923    2 Sheets-Sheet 2

Inventor:
G. Jacquet
By Marks & Clerk
Attys

Patented Jan. 8, 1924.

1,480,076

UNITED STATES PATENT OFFICE.

GEORGES JACQUET, OF CHARLEROI, BELGIUM.

CHECKING APPARATUS FOR PIGEON-FLYING COMPETITIONS.

Application filed February 5, 1923. Serial No. 617,053.

*To all whom it may concern:*

Be it known that GEORGES JACQUET, subject of the King of the Belgians, residing at No. 84 Rue du Mambourg, Charleroi, Belgium, has invented certain new and useful Improvements in Checking Apparatus for Pigeon-Flying Competitions, of which the following is a specification.

The present invention has for its object a checking apparatus intended to register the arrival of pigeons at their pigeon house during pigeon flying competitions. Apparatus of this kind generally consist of a clockwork mechanism which operates one or more dials marked with divisions of time, and a marking mechanism which, under the action of a cam, makes a mark on the dials, at a different distance from the centre, every time a movement is imparted to a member into which the identification rings or tags of the pigeons are introduced immediately after their arrival.

As these apparatus have to be entrusted to different competitors, it is important that while of small size they shall be constructed in such a manner that any attempt at fraud shall be prevented. It is likewise necessary, in order to avoid all confusion, that they shall give accurate and clear indications. In this respect the use of a marking device moved by a cam offers certain disadvantages, because it frequently happens that the marks are made too close together to enable them to be distinguished from each other, and on the other hand it is possible to tamper with the marking device in such a way as to influence the movement of the clockwork mechanism.

These disadvantages are obviated by the apparatus according to the present invention in which the marking mechanism is composed of a series of elastic blades carrying each a needle and adapted to be acted upon by a common operating means such as a drum provided with projections each of which in its turn operates a blade each time a partial rotation is imparted to the drum. By means of this arrangement the indications can be distributed over a considerable amount of space and the relative position of the various indications can be determined at will.

On the shaft of the drum is keyed a barrel having a number of recesses only one of which is accessible at a time for the introduction of a pigeon ring. This shaft is operated by hand and carries a locking device arranged in such a way that the cover can not be opened to permit of the removal of the dials until all the marks have been made and the barrel has passed through a fixed position which is determined by a stop.

In the accompanying drawings which represent by way of example a constructional form of the apparatus according to this invention:

Figure 1:
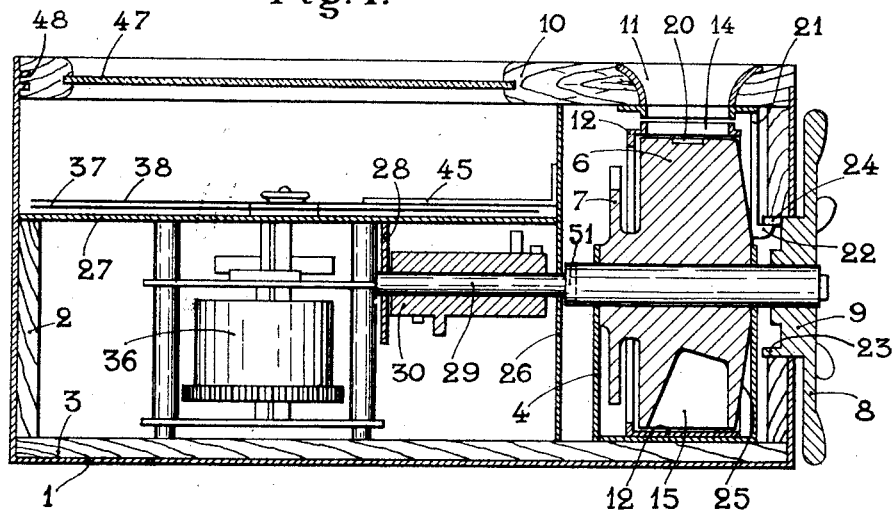
Figure 1 is a vertical and longitudinal section of the apparatus on the line A B of Figure 2.

The apparatus illustrated is enclosed in a casing of metal 1 lined with walls 2 and a bottom 3 of wood. On this bottom 3 is fixed a support 4 (see Figures 1 and 2) in which is mounted a shaft 5 on which is secured the barrel 6 which is made in one piece with a ratchet wheel 7. A hand or operating wheel 8 placed outside the casing 1 and the hub 9 of which projects slightly into a side wall thereof is likewise secured to the shaft 5.

On the casing 1 is fitted a cover 10 having an opening 11 above the shaft of the barrel. The periphery of this latter is closely surrounded with an annular sheath or covering 12 having a lug 13 secured to the bottom 3 of the casing. This sheath 12 is pierced with an opening 14 in alignment with the opening 11 in the cover.

Figure 4:
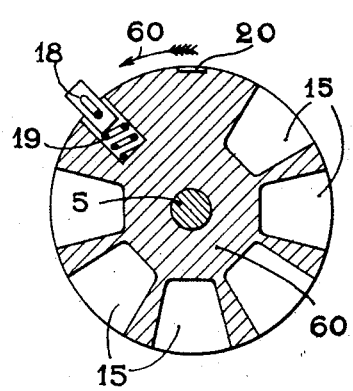
Figure 4 is a section of the barrel.

In the barrel are hollowed out a number of recesses 15 (see Figure 4) intended to receive the rings introduced through the openings 11 and 14. When the wheel 8 is rotated the rings are imprisoned in the recesses 15 which form with the sheath or covering 12 pockets closed on all sides, except when they are brought beneath the openings 11, 14. In order to facilitate the removal of the rings when the apparatus is opened for checking purposes the recesses are made in the shape of the frustrum of a cone the axis of which is slightly inclined with respect to the perpendicular to the shaft 5 (see Figure 1) so that it suffices to tilt the apparatus without returning it to cause the rings to come out.

The barrel shown has six recesses 15 (Fig. 4) and it can assume eight successive positions during a complete revolution of the wheel 8. After each rotation of one-eighth of a revolution it is retained in position by a spring catch 16 (Fig. 3) which is fixed by its base 17 to the bottom 3 of the casing and engages with the ratchet 7 which is provided with eight teeth. In six successive positions of the barrel the six recesses 15 are brought in succession under the openings 11 and 14. When the barrel occupies the seventh position, a spring stop 18 normally held by the sheath 12 in a small cavity 19 in the barrel, projects through the openings 11 and 14 and locks the wheel 8 and the shaft 5. Finally in the last position (shown in Figures 1 to 4), the barrel shows through the openings 11, 14 a mark 20 which indicates that the apparatus is in the open position.

To the lower face of the cover is fixed a rod 21 having a hook-shaped head 22 engaging under an annular flange 23 on the hub of the wheel 8. In this hub is made a notch 24 just large enough to allow the hook 22 to pass therethrough. When the mark 20 on the barrel is visible the notch 24 is located above the hook 22 and the cover 10 can be freely removed, but in all the other positions of the barrel it is locked in position by the engagement of the hook under the flange 23. In order to render the locking more efficacious, the face 25 of the barrel adjacent the rod 21, is given a conical shape so that, while permitting of the introduction of the rod 21 into the casing when the apparatus is in the open position, it prevents the disengagement of the hook 22 from under the flange 23 by means of a tool when the apparatus is closed.

Figure 2:
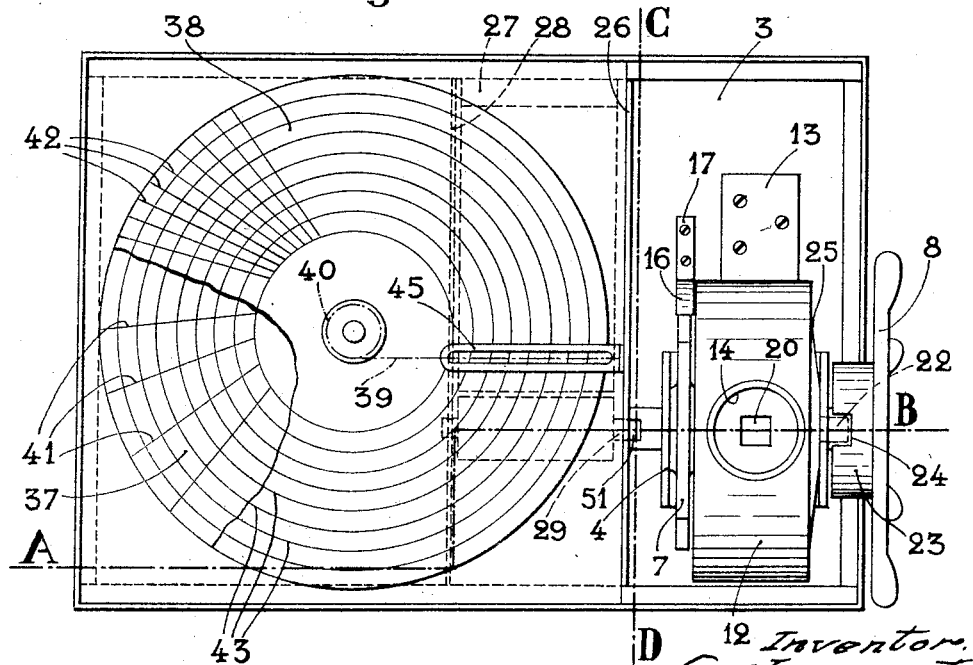
Figure 2 is a plan view, the cover being removed.
Figure 3:
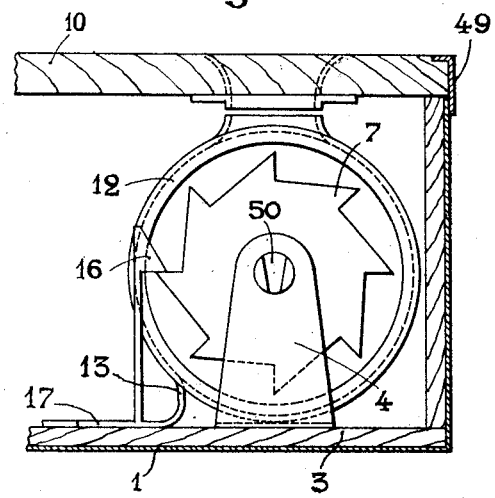
Figure 3 is a partial transverse section on the line C D of Figure 2.

A transverse partition 26 separates the mechanism above described from the marking devices and the clockwork mechanism. To this partition is soldered a horizontal partition 27 fixed by its edges to the walls 2. The partition 26 and a transverse plate 28 likewise soldered to the partition 27 serve to support a shaft 29 located in alignment with the shaft 5. In the end of this latter is cut a groove 50 (see Figure 3), in the form of a wedge in which engages a corresponding rib or feather 51 integral with the shaft 29 (Fig. 2). By means of this arrangement the shafts 29 and 5 always occupy the same angular position with respect to each other when the apparatus is assembled.

Figure 5:
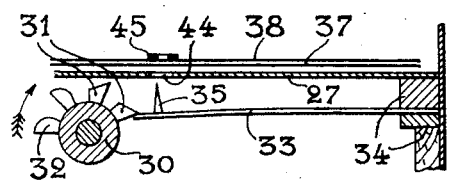
Figure 5 shows the marking devices in section on the line E F of Figure 7.
Figure 6:
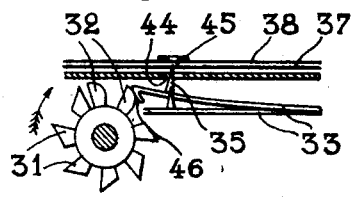
Figure 6 shows the marking devices in elevation in a different position.
Figure 7:
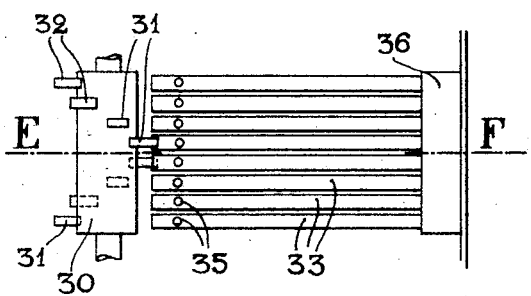
Figure 7 is a plan view of the marking devices.

On the shaft 29 is keyed the drum 30 for operating the marking devices, which drum is provided at different points on its length with six projections 31 and two projections 32 separated from each other by one-eighth of the circumference of the drum. Opposite these projections are located the ends of eight elastic blades 33 (see Figures 5 to 7) held at their opposite ends between two plates 34 firmly attached to the partition 27. The blades 33 which constitute the marking devices each carry a pointer or needle 35 at a point near its free end.

The clockwork movement 36 likewise placed underneath the partition 27 is of the ordinary type except that the hour and minute hands are replaced by two dials or discs of paper one of which (37) makes one revolution in twenty-four hours and the other one (38) one revolution in one hour. In the example shown the row of needles 35 is arranged along a line 39 tangential to an imaginary circle 40 (see Figure 2) concentric with the shaft of the clockwork mechanism, and the dials 37 and 38 are divided, one into twenty-four parts and the other into sixty parts, by lines 41 and 42 tangential to the circle 40. Each dial is also provided with eight concentric circles 43 passing over the intervals which separate the needles 35 from each other. The partition 27 has a slot 44 above the row of needles 35, and a slotted guide 45 fixed to the partition 26 holds the dials 37 and 38 against the partition 27 at this point (see Figures 2 and 5).

The needles 35 are intended to make on the dials 37 and 38 the necessary marks or perforations required to permit of the classification of the competitors. To make the successive marks it suffices to rotate the wheel 8 each time one eighth of a revolution, so that all the marks relating to the same race are inscribed in the course of one complete revolution of the wheel 8. In the apparatus shown the first and last marks are made by the official superintendent, one before handing over the apparatus to the competitor and the other after the return of the apparatus to the superintendent. These two marks are made by the teeth 32 (see Figure 6) which act directly on the corresponding blades 33 by raising the curved ends 46 of these blades in such a way as to force their needles 35 into the paper of the dials.

This mode of action would not be suitable for the six marks which are to be made by the competitors themselves as a competitor might be tempted to retard the wheel 8 between its positions of stoppage by holding one of the needles 35 in the discs 37, 38, thus locking the clockwork mechanism for a certain time. In order to prevent these attempts at fraud each of the six teeth 31 is arranged so as to depress the corresponding blade 33 (see Figure 5) and then release it suddenly so that the needle 35 is projected upwards by the elasticity of its blade and makes an instantaneous puncture.

Figure 8:
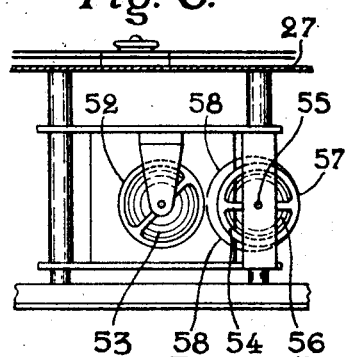
Figure 8 shows a detail of the clockwork mechanism.

On the other hand to prevent the clockwork movement from being accelerated at certain moments by shaking the apparatus, there is mounted beside the pendulum of the clockwork a member which is designed to exert a slight braking action on the pendulum when the apparatus is shaken. In Figure 8 which shows the back of the clockwork mechanism represented in Figure 1, 52 is a wheel shaped pendulum which oscillates in the usual manner under the action of a spiral spring 53. Beside the pendulum 52 is mounted a wheel 54 which is connected to its fixed shaft 55 by a spiral spring 56 and can oscillate freely on this shaft when the apparatus is shaken. At a point 57 on the periphery of the wheel 54 are fixed two elastic blades 58 the curvature of which is eccentric to the wheel 54, such blades being so devised that their ends will rub lightly against the periphery of the rock lever 52 when the apparatus is rythmically shaken for the purpose of accelerating the movement of the clockwork mechanism.

The apparatus works as follows:

The superintendent in charge of the races opens the apparatus, the parts being in the position shown in Figures 1 to 4, and he fits the discs 37 and 38 on the concentric shafts of the clockwork mechanism. He then closes down the cover 10 one edge of which is grooved to receive ribs 48 (see Figure 1) on the wall 1 and the longitudinal edges of which are provided with flanges 49 (Figure 3) so as to prevent the introduction of objects which might interfere with the working of the apparatus. Before the apparatus is entrusted to the competitor the superintendent sets the clockwork mechanism going and he gives the wheel 8 one-eighth of a turn in the direction of the arrow 60 (see Figure 4). This movement brings the first recess 15 underneath the openings 11 and 14 while the second of the teeth 32 lifts the corresponding blade 33 the needle 35 of which pierces the dials 37 and 38 and then flies back. The mark thus made permits of determining by its position with respect to the graduations 41 and 42, the hour at which the apparatus was handed to the competitor. From this moment the hook 22 is caught beneath the flange 23 of the hub of the wheel 8 and, as all movement of the wheel backwards is prevented by the ratchet 16, the apparatus cannot be opened except when the eight punctures have been made in the dials 37 and 38. Above the dials the cover 10 has a large opening in which is permanently inserted a sheet of glass 47 which permits of watching the working of the apparatus.

When the apparatus is handed over to the competitor he awaits the arrival of the first pigeon at the pigeon house and he then removes from the bird its ring which he places in the first recess 15 after which he turns the wheel 8 through one eighth of a revolution. This movement brings the second recess 15 under the openings 11, 14 and produces the release by the first tooth 31 of the corresponding blade 33 the needle 35 of which pierces the dials 37, 38 and then flies back. The same operation is repeated after the arrival of each pigeon until a rotation of the wheel 8 through one-eighth of a revolution brings the stop 18 into engagement with the edges of the openings 11 and 14.

The apparatus is then handed back to the superintendent's office who pushes back the stop 18 and makes the last turn of the wheel 8 through one-eighth of a revolution which brings the mark 20 into the position which is shown in Figures 1 to 4 and which allows the apparatus to be opened and emptied. At the same time the first tooth 32 makes a last checking puncture. The superintendent then takes off the cover and removes the dials 37 and 38 the eight punctures in which indicate by their positions the exact moments at which the apparatus was set going, has registered the arrivals of the pigeons belonging to the same pigeon house and has been returned to the office of the superintendent. The successive punctures are separated by the circles 43 which allows them to be easily identified. In the apparatus shown the first puncture is the nearest to the centre of the dials and the second puncture (which is the first of the punctures indicating the arrivals of the pigeons) is the nearest to the edge of the dials which facilitates reading. The following punctures move progressively towards the centre and the last puncture is alongside the first.

As the results are cancelled if the dials show more than eight punctures the competitors cannot juggle the barrel out of the position in which it is held by the stop 18.

The barrel and the marking devices are made of non-magnetic metal so that they cannot be tampered with by magnets. The barrel for example will be made of aluminium and the drum 30 and the blades 33 of bronze or brass.

Various modifications may obviously be made in the apparatus shown without departing from the scope of the invention.

I claim:

1. In checking apparatus for pigeon flying competitions and the like, the combination of a casing, a clockwork in said casing, a dial adapted to be rotated by said clockwork, a rotary barrel for receiving the identification rings of the pigeons, a plurality of marking members arranged side by side, and means operatively connected with said barrel for successively causing each of said members to make a mark on said dial.

2. In checking apparatus for pigeon flying competitions and the like, the combination of a casing, a clockwork in said casing, a dial adapted to be rotated by said clockwork, a rotary barrel having a plurality of recesses for receiving the identification rings of the pigeons, a plurality of elastic blades arranged side by side, said blades being firmly supported at one end, a needle on the free end of each blade adapted to puncture said dial, a drum operatively connected with said barrel, and projections on said drum for singly operating said blades.

3. In checking apparatus for pigeon flying competitions and the like, the combination of a casing, a dial mounted for continuous rotation in said casing, a member for receiving the pigeons' identification rings, said member being mounted for stepwise rotation in said casing, a plurality of elastically supported marking members adapted to mark said dial at different distances from its centre, and means operatively connected with said stepwise rotating member for successively operating said marking members.

4. In checking apparatus for pigeon flying competitions and the like, the combination of a casing, a dial mounted for continuous rotation in said casing, a barrel mounted for stepwise rotation in said casing, said barrel being adapted to receive the pigeons' identification rings at different points of its periphery, a cover for said casing having an opening above said barrel, a plurality of elastic blades supported at one end, and arranged side by side in a plane substantially parallel to said dial, a needle on the free end of each blade, and means operatively connected with said barrel for singly engaging the free end of each blade, said needles being adapted to puncture said dial upon the release of said blades by said means.

5. In checking apparatus for pigeon flying competitions and the like, the combination of a casing, a dial mounted for continuous rotation in said casing, a barrel mounted for stepwise rotation in said casing, an annular sheath closely surrounding said barrel and having an opening, said barrel having on its periphery a stop, a mark and a plurality of recesses adapted to be successively brought under said opening by the stepwise rotation of said barrel, a plurality of elastic blades firmly supported at one end and carrying each a needle on its free end, a rotary drum operatively connected with said barrel and having projections corresponding in number and position to said blades, one of said projections being adapted to operate its corresponding blade to puncture said dial every time said barrel is rotated, two of said projections being adapted to move their blades towards said dial and the other projections adapted to move their blades away from said dial.

6. In checking apparatus for pigeon flying competitions and the like, the combination of a casing, a dial mounted for continuous rotation in said casing, a hand-operated barrel mounted for stepwise rotation in said casing, a cover for said casing having an opening above said barrel, said barrel having a mark and a plurality of recesses adapted to be successively brought under said opening, a plurality of elastically supported needles for puncturing said dial at different distances from its centre, means operatively connected with said barrel for successively operating said needles, and means operatively connected with said barrel for locking said cover in position except when the mark on said barrel is visible through said opening.

7. In checking apparatus for pigeon flying competitions and the like, the combination of a casing, a dial mounted for continuous rotation in said casing, a barrel mounted for stepwise rotation in said casing, a hand wheel for operating said barrel, a flange on the hub of said wheel projecting into said casing, a cover for said casing having an opening, said barrel having a mark and a plurality of recesses adapted to be successively brought under said opening, a hook depending from said cover and adapted to engage under said flange, said flange having a notch for allowing said hook to pass therethrough when said mark is visible through said opening, and means including a plurality of elastically supported needles for puncturing said dial each time said hand-wheel is operated.

8. In checking apparatus for pigeon flying competitions and the like, the combination of a casing, a clockwork in said casing, a dial in said casing adapted to be rotated by said clockwork, a rotary barrel for receiving the identification rings of the pigeons, a hand wheel for operating said barrel, a flange on the hub of said wheel projecting into said casing, a cover for said casing, a hook depending from said cover and adapted to engage under said flange, said barrel having a conical face adapted to hold said hook in engagement with said flange, said flange having a notch for allowing said hook to pass therethrough when said barrel is in a predetermined position, a plurality of elastically supported needles arranged side by side, and means for successively causing each of said needles to puncture said dial when said barrel is rotated.

9. In checking apparatus for pigeon flying competitions and the like, the combination of a casing, a clockwork in said casing, a dial in said casing adapted to be rotated by said clockwork, a hand operated barrel mounted for stepwise rotation in said casing, said barrel having in its periphery a number of inclined conical recesses, a plurality of elastically supported needles for puncturing said dial at different distances from its centre, and means for successively causing each of said needles to puncture said dial when said barrel is rotated.

10. In checking apparatus for pigeon flying competitions and the like, the combination of a casing, a clockwork in said casing, said clockwork having an oscillating pendulum, means for frictionally engaging said pendulum when said apparatus is rhythmically shaken, a dial in said casing adapted to be rotated by said clockwork, a hand operated barrel of non-magnetic material mounted for stepwise rotation in said casing, a cover for said casing having an opening, said casing having a plurality of recesses adapted to be successively brought under said opening, means for locking said cover to said casing, said means being inoperative when said barrel is in a predetermined position, a plurality of elastic blades of non-magnetic material firmly supported at one end, a needle on the free end of each blade adapted to puncture said dial, a drum operatively connected with said barrel, and projections on said drum for singly operating said blades.

GEORGES JACQUET.